United States Patent [19]

Takenaka et al.

[11] Patent Number: 4,926,191

[45] Date of Patent: May 15, 1990

[54] IMAGE RECORDING APPARATUS AND METHOD OF CARRYING OUT INITIALIZING PROCESS IN IMAGE RECORDING APPARATUS

[75] Inventors: Eiji Takenaka, Isehara; Naoki Muraoka; Yoshikazu Nakadai, both of Atsugi, all of Japan

[73] Assignee: Ricoh Company, Ltd., Tokyo, Japan

[21] Appl. No.: 350,221

[22] Filed: May 11, 1989

[30] Foreign Application Priority Data

May 16, 1988 [JP] Japan ............................... 63-120007
Aug. 26, 1988 [JP] Japan ............................... 63-212802

[51] Int. Cl.[5] ........................ G01D 9/00; G01D 15/10; G01D 15/34

[52] U.S. Cl. ................................ 346/24; 346/76 PH; 346/136

[58] Field of Search .................... 346/24, 136, 76 PH; 358/296, 304; 355/309, 310, 313, 316, 317

[56] References Cited

U.S. PATENT DOCUMENTS 4,868,674 9/1989 Nakamura .......................... 346/136

FOREIGN PATENT DOCUMENTS 62-272742 11/1987 Japan .
62-272743 11/1987 Japan .
63-106261 5/1988 Japan .

*Primary Examiner*—Bruce A. Reynolds
*Assistant Examiner*—Scott A. Rogers
*Attorney, Agent, or Firm*—Oblon, Spivak, McClelland, Maier & Neustadt

[57] ABSTRACT

A controller of an image recording apparatus controls an initializing process for adjusting and appropriately positioning tip ends of the set recording sheets by transporting the recording sheets in a reverse direction until tip ends thereof are detected. After the tip end of one recording sheet is detected this recording sheet is transported in a forward direction until the tip end thereof reaches a position on the downstream side of a cutter, and a tip portion of this first recording sheet is cut by the cutter. This recording sheet is then transported in a reverse direction until a cut end of this recording sheet reaches a first predetermined position. After the tip end of the other recording sheet is detected this recording sheet is transported in the forward direction until the tip end thereof reaches a position on the downstream side of the cutter, and a tip portion of this recording sheet is cut by the cutter. This recording sheet is then transported in the reverse direction until a cut end of this recording sheet reaches a second predetermined position.

24 Claims, 8 Drawing Sheets

IMAGE RECORDING APPARATUS AND METHOD OF CARRYING OUT INITIALIZING PROCESS IN IMAGE RECORDING APPARATUS

BACKGROUND OF THE INVENTION

The present invention generally relates to image recording apparatuses and methods of carrying out an initializing process in the image recording apparatuses, and more particularly to an image recording apparatus wherein two or more rolls of recording sheets are set and a method of automatically carrying out an initializing process with respect to the recording sheets of the image recording apparatus.

An image recording apparatus such as a facsimile machine which makes a recording on a recording sheet by use of a thermal head is generally provided with an automatic cutter for cutting the recording sheet which is supplied from a roll of the recording sheet. The automatic cutter cuts a tip portion of the recording sheet to adjust the shape of a tip end of the recording sheet when the roll of the recording sheet is changed. The shape of the tip end of the recording sheet is adjusted to prevent a paper jam and to provide a sufficient top margin so that there is no dropout of image recorded on the recording sheet.

Conventionally, when changing the roll of recording sheet in the image recording apparatus which uses one roll of recording sheet, an operator manually sets a new roll of recording sheet so that the tip end of the recording sheet is located at an entrance of the automatic cutter or inserted within the automatic cutter. Then, a platen roller rotates in a forward direction to feed the recording sheet a predetermined distance and the automatic cutter cuts the tip portion of the recording sheet. After the recording sheet is cut, the platen roller rotates in a reverse direction until the cut end of the recording sheet is positioned on the platen roller.

On the other hand, the image recording apparatus may use two rolls of recording sheets for the purpose of enabling the recording on two kinds of recording sheets having mutually different widths, for example. FIG. 1 shows an essential part of a recording apparatus 1 as an example of a conventional image recording apparatus using two rolls of recording sheets. In FIG. 1, the recording apparatus 1 generally has a platen roller 2, a thermal head 3, an automatic cutter 4, feed rollers 5 and 6, pressure rollers 7 and 8, a manual cutter 9, and two rolls of recording sheets 10 and 11. First, the operator sets the roll of the recording sheet 10 so that a tip end of the recording sheet 10 is located at an entrance of the automatic cutter 4 or within the automatic cutter 4. Then, the operator sets the roll of the recording sheet 11 by cutting a tip portion of the recording sheet 11 by the manual cutter 9 and positioning the cut end of the recording sheet 11 between the platen roller 2 and the feed roller 6. After the rolls of the recording sheets 10 and 11 are set independently by a controller, the recording apparatus 1 carries out an initializing process with respect to the recording sheets 10 and 11 in accordance with a procedure shown in FIG. 2.

In FIG. 2, a step P1 rotates the feed roller 5 in the forward direction so as to feed the recording sheet 10 a predetermined distance, and a step P2 cuts a tip portion of the recording sheet 10 by the automatic cutter 4. A step P3 rotates the feed roller 5 in the reverse direction until the cut end of the recording sheet 10 reaches a predetermined position between the platen roller 2 and the feed roller 5. A step P4 rotates the feed roller 6 in the forward direction until the tip end of the recording sheet 11 enters sufficiently within the automatic cutter 4, and a step P5 cuts a tip portion of the recording sheet 11 by the automatic cutter 4. A step P6 rotates the feed roller 6 in the reverse direction until the cut end of the recording sheet 11 reaches a position on the platen roller 2.

However, the initializing process of adjusting and positioning the tip ends of the two kinds of recording sheets 10 and 11 is not the same for the two rolls of the recording sheets 10 and 11 which are set. Hence, the operator must carry out a troublesome operation of setting the two rolls of the recording sheets 10 and 11 in manners different between the two. As a result, the operator may make an error when setting the two rolls of the recording sheet 10 and 11, and the different methods of setting the two rolls of the recording sheets 10 and 11 makes the setting operation inconvenient and not user friendly. In addition, when setting the roll of the recording sheet 11, the tip portion of the recording sheet 11 must once be cut manually by the manual cutter 9 and there is a danger in that the operator may cut his fingers or hands if not careful.

SUMMARY OF THE INVENTION

Accordingly, it is a general object of the present invention to provide a novel and useful image recording apparatus and a method of carrying out an initializing process in the image recording apparatus in which the problems described above are eliminated.

Another and more specific object of the present invention is to provide an image recording apparatus comprising first support means for supporting a first roll of a first recording sheet, second support means for supporting a second roll of a second recording sheet, first transport means including a first roller for transporting the first recording sheet in forward and reverse directions, second transport means including a second roller for transporting the second recording sheet in the forward and reverse directions, a platen roller located at a position on a downstream side of the first and second transport means along the forward direction, driver means for rotating the platen roller in directions for transporting the first and second recording sheets in the forward and reverse directions, recording means for recording an image on one of the first and second recording sheets placed on the platen roller, a first sensor for detecting the first recording sheet in a transport path between the first transport means and the platen roller, a second sensor for detecting the second recording sheet in a transport path between the second transport means and the platen roller, a cutter located at a position on the downstream side of the platen roller along the forward direction, and control means for controlling the first and second transport means, the driver means, and the cutter responsive to output detection signals of the first and second sensors. In an initial state the first and second rolls of the first and second recording sheets are set in the image recording apparatus so that tip ends of the first and second recording sheets are located on the downstream side of the corresponding first and second sensors along the forward direction. The control means controls an initializing process for adjusting and appropriately positioning the tip ends of the set first and second recording sheets by driving the first and second transport means to transport the first and second recording sheets in the reverse direction until the tip ends thereof are detected by the first and second sensors, after the tip end of the first recording sheet is detected driving the first transport means to transport the first recording sheet a distance in the forward direction until the tip end thereof reaches a position on the downstream side of the cutter, driving the cutter to cut a tip portion of the first recording sheet, driving the first transport means to transport the first recording sheet a distance in the reverse direction until a cut end of the first recording sheet reaches a first predetermined position between the platen roller and the first roller of the first transport means, after the tip end of the second recording sheet is detected driving the second transport means to transport the second recording sheet a distance in the forward direction until the tip end thereof reaches a position on the downstream side of the cutter, driving the cutter to cut a tip portion of the second recording sheet, driving the second transport means to transport the second recording sheet a distance in the reverse direction until a cut end of the second recording sheet reaches a second predetermined position between the platen roller and the second roller of the second transport means. According to the image recording apparatus of the present invention, the operation of changing the first and second recording sheets is simple and easy to carry out, and the initializing process can be carried out automatically without the need for the operator to use a manual cutter.

Still another object of the present invention is to provide an image recording apparatus comprising first support means for supporting a first roll of a first recording sheet, second support means for supporting a second roll of a second recording sheet, first transport means including a first roller for transporting the first recording sheet in forward and reverse directions, second transport means including a second roller for transporting the second recording sheet in the forward and reverse directions, a platen roller located at a position on a downstream side of the first and second transport means along the forward direction, driver means for rotating the platen roller in directions for transporting the first and second recording sheets in the forward and reverse directions, recording means for recording an image on one of the first and second recording sheets placed on the platen roller, a first sensor for detecting the first recording sheet in a transport path between the first transport means and the platen roller, a second sensor for detecting the second recording sheet in a transport path between the second transport means and the platen roller, a cutter located at a position on the downstream side of the platen roller along the forward direction, and control means for controlling the first and second transport means, the driver means, and the cutter responsive to output detection signals of the first and second sensors. In an initial state the first and second rolls of the first and second recording sheets are set in the image recording apparatus so that tip ends of the first and second recording sheets are located on the downstream side of the corresponding first and second sensors along the forward direction. The control means controls an initializing process for adjusting and appropriately positioning the tip ends of the set first and second recording sheets by driving the first and second transport means to transport the first and second recording sheets in the reverse direction until the tip end one of the first and second recording sheets is detected by a corresponding one of the first and second sensors, after the tip end of the one of the first and second recording sheets is detected driving a corresponding one of the first and second transport means to transport the one of the first and second recording sheets a distance in the forward direction until the tip end thereof reaches a position on the downstream side of the cutter, driving the cutter to cut a tip portion of the one of the first and second recording sheets, driving the one of the first and second transport means to transport the one of the first and second recording sheets a distance in the reverse direction until a cut end of the one of the first and second recording sheets reaches a first predetermined position between the platen roller and a corresponding one of the first and second rollers of the first and second transport means, driving the other of the first and second transport means to transport the other of the first and second recording sheets a distance in the forward direction until the tip end thereof reaches a position on the downstream side of the cutter, driving the cutter to cut a tip portion of the other of the first and second recording sheets, driving the other of the first and the second transport means to transport the other of the first and second recording sheets a distance in the reverse direction until a cut end of the other of the first and second recording sheets reaches a second predetermined position on the downstream side of the other of the first and second transport means along the forward direction.

A further object of the present invention is to provide an image recording apparatus comprising first support means for supporting a first roll of a first recording sheet, second support means for supporting a second roll of a second recording sheet, first transport means including a first roller for transporting the first recording sheet in forward and reverse directions, second transport means including a second roller for transporting the second recording sheet in the forward and reverse directions, a platen roller located at a position on a downstream side of the first and second transport means along the forward direction, driver means for rotating the platen roller in directions for transporting the first and second recording sheets in the forward and reverse directions, recording means for recording an image on one of the first and second recording sheets placed on the platen roller, a cutter located at a position on the downstream side of the platen roller along the forward direction, and control means for controlling the first and second transport means, the driver means, and the cutter. In an initial state the first and second rolls of the first and second recording sheets are set in the image recording apparatus so that tip ends of the first and second recording sheets are located on the downstream side of the cutter along the forward direction. The control means controls an initializing process for adjusting and appropriately positioning the tip ends of the set first and second recording sheets by driving the cutter to cut a tip portion of each of the first and second recording sheets, driving the first and second transport means to transport the first and second recording sheets respective distances in the reverse direction until a cut end of the first recording sheet reaches a first predetermined position between the platen roller and the first roller of the first transport means and a cut end of the second recording sheet reaches a second predetermined position between the platen roller and the second roller of the second transport means.

Another object of the present invention is to provide a method of automatically carrying out an initializing process with respect to recording sheets of the image recording apparatus for adjusting and appropriately positioning tip ends of first and second recording sheets which are set in the image recording apparatus which comprises first support means for supporting a first roll of the first recording sheet, second support means for supporting a second roll of the second recording sheet, first transport means including a first roller for transporting the first recording sheet in forward and reverse directions, second transport means including a second roller for supporting the second recording sheet in the forward and reverse directions, a platen roller located at a position on a downstream side of the first and second transport means along the forward direction, driver means for rotating the platen roller in directions for transporting the first and second recording sheets in the forward and reverse directions, recording means for recording an image on one of the first and second recording sheets placed on the platen roller, a cutter located at a position on the downstream side of the platen roller along the forward direction, and control means for controlling the first and second transport means, the driver means, and the cutter, where in an initial state the first and second rolls of the first and second recording sheets are set in the image recording apparatus so that tip ends of the first and second recording sheets are located on the downstream side of the corresponding first and second rollers of the first and second transport means along the forward direction, and the method comprises the steps of driving the first and second transport means to transport the first and second recording sheets in the reverse direction until the tip ends thereof are detected, after the tip end of the first recording sheet is detected driving the first transport means to transport the first recording sheet a distance in the forward direction until the tip end thereof reaches a position on the downstream side of the cutter, driving the cutter to cut a tip portion of the first recording sheet, driving the first transport means to transport the first recording sheet a distance in the reverse direction until a cut end of the first recording sheet reaches a first predetermined position between the platen roller and the first roller of the first transport means, after the tip end of the second recording sheet is detected driving the second transport means to transport the second recording sheet a distance in the forward direction until the tip end thereof reaches a position on the downstream side of the cutter, driving the cutter to cut a tip portion of the second recording sheet, and driving the second transport means to transport the second recording sheet a distance in the reverse direction until a cut end of the second recording sheet reaches a second predetermined position between the platen roller and the second roller of the second transport means.

Still another object of the present invention is to provide a method of automatically carrying out an initializing process with respect to recording sheets of the image recording apparatus for adjusting and appropriately positioning tip ends of first and second recording sheets which are set in the image recording apparatus which comprises first support means for supporting a first roll of the first recording sheet, second support means for supporting a second roll of the second recording sheet, first transport means including a first roller for transporting the first recording sheet in forward and reverse directions, second transport means including a second roller for transporting the second recording sheet in the forward and reverse directions, a platen roller located at a position on a downstream side of the first and second transport means along the forward direction, driver means for rotating th platen roller in directions for transporting the first and second recording sheets in the forward and reverse directions, recording means for recording an image on one of the first and second recording sheets placed on the platen roller, a cutter located at a position on the downstream side of the platen roller along the forward direction, and control means for controlling the first and second transport means, the driver means, and the cutter, where in an initial state the first and second rolls of the first and second recording sheets are set in the image recording apparatus so that tip ends of the first and second recording sheets are located on the downstream side of the corresponding first and second rollers of the first and second transport means along the forward direction. and the method comprises the steps of driving the first and second transport means to transport the first and second recording sheets in the reverse direction until the tip end one of the first and second recording sheets is detected, after the tip end of the one of the first and second recording sheets is detected driving a corresponding one of the first and second transport means to transport the one of the first and second recording sheets a distance in the forward direction until the tip end thereof reaches a position on the downstream side of the cutter, driving the cutter to cut a tip portion of the one of the first and second recording sheets, driving the one of the first and second transport means to transport the one of the first and second recording sheets a distance in the reverse direction until a cut end of the one of the first and second recording sheets reaches a first predetermined position between the platen roller and a corresponding one of the first and second rollers of the first and second transport means, driving the other of the first and second transport means to transport the other of the first and second recording sheets a distance in the forward direction until the tip end thereof reaches a position on the downstream side of the cutter, driving the cutter to cut a tip portion of the other of the first and second recording sheets, and driving the other of the first and the second transport means to transport the other of the first and second recording sheets a distance in the reverse direction until a cut end of the other of the first and second recording sheets reaches a second predetermined position on the downstream side of the other of the first and second transport means along the forward direction.

A further object of the present invention is to provide a method of automatically carrying out an initializing process with respect to recording sheets of the image recording apparatus for adjusting and appropriately positioning tip ends of first and second recording sheets which are set in the image recording apparatus which comprises first support means for supporting a first roll of a first recording sheet, second support means for supporting a second roll of a second recording sheet, first transport means including a first roller for transporting the first recording sheet in forward and reverse directions, second transport means including a second roller for transporting the second recording sheet in the forward and reverse directions, a platen roller located at a position on a downstream side of the first and second transport means along the forward direction, driver means for rotating the platen roller in directions for transporting the first and second recording sheets in the forward and reverse directions, recording means for recording an image on one of the first and second recording sheets placed on the platen roller, a cutter located at a position on the downstream side of the platen roller along the forward direction, and control means for controlling the first and second transport means, the driver means, and the cutter, where in an initial state the first and second rolls of the first and second recording sheets are set in the image recording apparatus so that tip ends of the first and second recording sheets are located on the downstream side of the cutter along the forward direction, and the method comprises the steps of driving the cutter to cut a tip portion of each of the first and second recording sheets, and driving the first and second transport means to transport the first and second recording sheets respective distances in the reverse direction until a cut end of the first recording sheet reaches a first predetermined position between the platen roller and the first roller of the first transport means and a cut end of the second recording sheet reaches a second predetermined position between the platen roller and the second roller of the second transport means.

Other objects and further features of the present invention will be apparent from the following detailed description when read in conjunction with the accompanying drawings.

DESCRIPTION OF THE PREFERRED EMBODIMENTS

Figure 1:
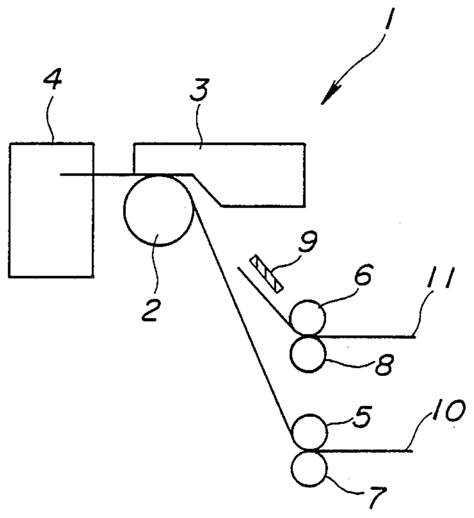
FIG. 1 (PRIOR ART)
FIG. 1 generally shows an essential part of an example of a conventional image recording apparatus which uses two rolls of recording sheets.
Figure 3:
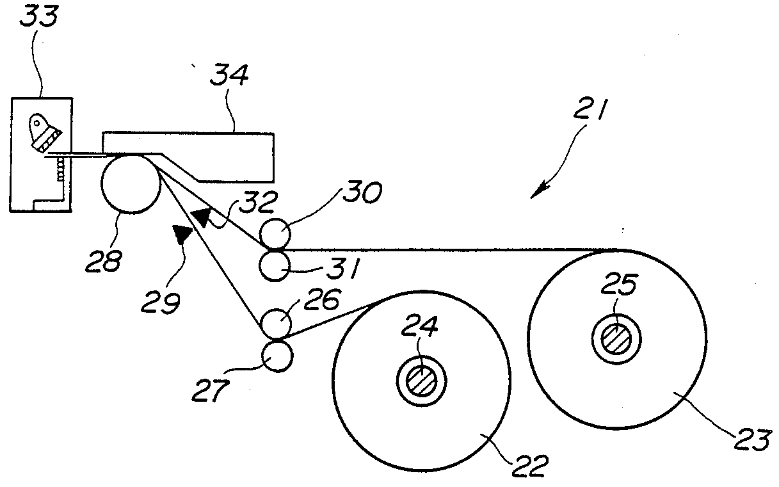
FIG. 3 generally shows an essential part of an embodiment of an image recording apparatus according to the present invention.
Figure 2:
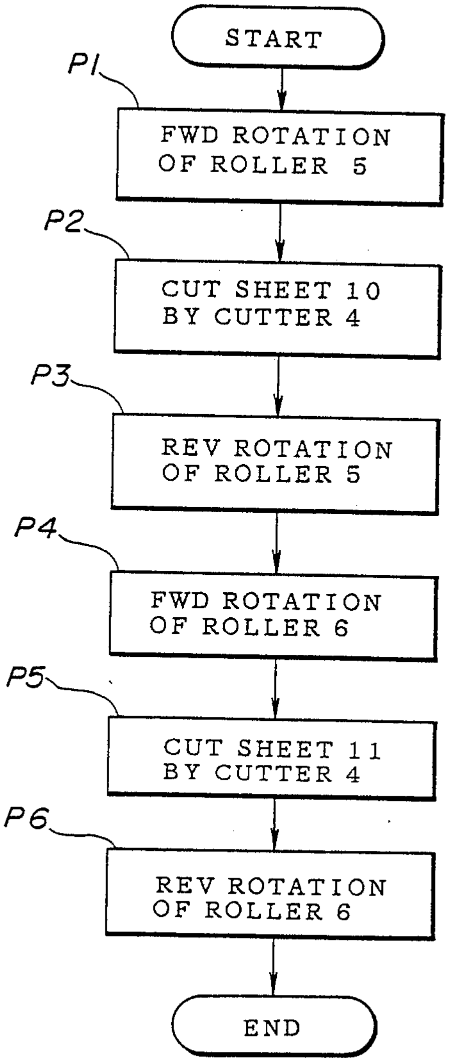
FIG.2 (PRIOR ART)
FIG. 2 is a flow chart for explaining an initializing process of the conventional image recording apparatus shown in FIG. 1.

First, a description will be given of an embodiment of an image recording apparatus according to the present invention. In this embodiment, the present invention is applied to a facsimile machine 21 for the sake of convenience. FIG. 3 generally shows an essential part of this embodiment, and FIG. 4 shows an essential part of an electrical system of this embodiment.

In FIG. 3, two rolls of recording sheets 22 and 23 are accommodated within the facsimile machine 21. The roll of the recording sheet 22 is rotatably supported on a support shaft 24, while the roll of the recording sheet 23 is rotatably supported on a support shaft 25.

Figure 4:
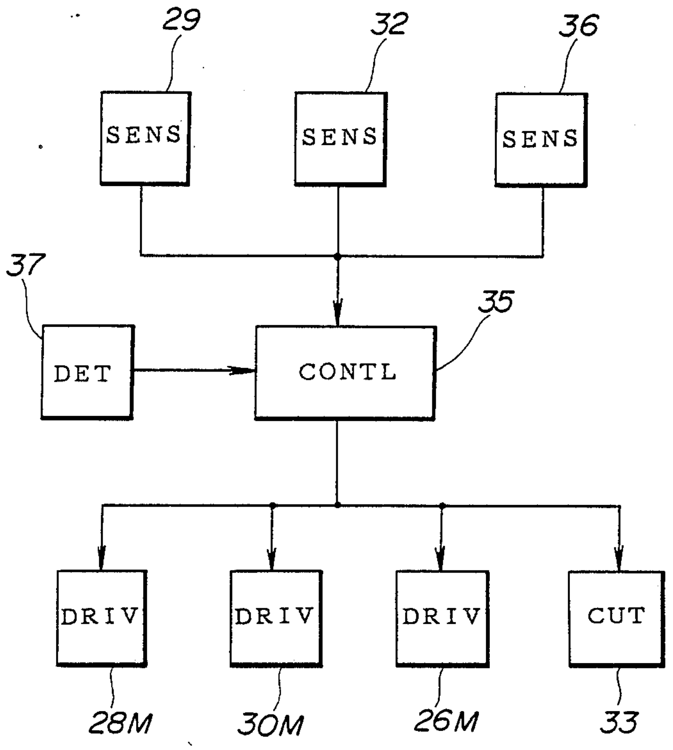
FIG. 4 is a system block diagram showing an essential part of an electrical system of the image recording apparatus shown in FIG. 3.

The recording sheet 22 is pinched between a feed roller 26 and a pressure roller 27 and is transported to a platen roller 28 when the feed roller 26 is rotated in a forward direction (clockwise in FIG. 3) by a feed roller driver 26M shown in FIG. 4 which is a motor, for example. A paper sensor 29 is provided in a transport path between the feed roller 26 and the platen roller 28 for detecting the recording sheet 22. For example, the paper sensor 29 is made up of a photocoupler.

On the other hand, the recording sheet 23 is pinched between a feed roller 30 and a pressure roller 31 and is transported to the platen roller 28 when the feed roller 30 is rotated in a forward direction (clockwise in FIG. 3) by a feed roller driver 30M shown in FIG. 4 which is a motor, for example. A paper sensor 32 is provided in a transport path between the feed roller 30 and the platen roller 28 for detecting the recording sheet 23. For example, the paper sensor 32 is made up of a photocoupler.

In a recording mode of the facsimile machine 21, one of the recording sheets 22 and 23 is selectively supplied to the platen roller 28 under a control of a controller 35 shown in FIG. 4, and the platen roller 28 is rotated in a forward direction (counterclockwise in FIG. 3) by a platen roller driver 28M shown in FIG. 4 which is a motor, for example. Hence, the selected recording sheet 22 or 23 is supplied to an automatic cutter 33. A thermal head 34 presses against the platen roller 28 to record an image on the selected recording sheet 22 or 23 which is wrapped around the platen roller 28. The thermal head 34 has a plurality of thermal elements arranged along an axis of the platen roller 28, and the thermal elements are selectively heated depending on the image information so as to record the image on the recording sheet 22 or 23. The cutter 33 cuts the recording sheet 22 or 23 which is supplied from the platen roller 28. The thermal head 34 may record the image by making direct contact with the recording sheet 22 or 23 when the recording sheets 22 and 23 are thermally sensitive paper. On the other hand, the thermal head 34 may record the image by pressing against the platen roller 28 via an ink sheet or ribbon when the recording sheets 22 and 23 are plain paper.

The drivers 26M, 28M, and 30M and the cutter 33 are controlled by the controller 35 shown in FIG. 4. This controller 35 receives output detection signals of the paper sensors 29 and 32.

When changing the recording sheets of the facsimile machine 21, the new recording sheets 22 and 23 are set as follows. That is, the roll of the recording sheet 22 is first placed in position so as to be supported by the support shaft 24. Then, the recording sheet 22 is passed between the feed roller 26 and the pressure roller 27 and wrapped around the platen roller 28, and the tip end of the recording sheet 22 is inserted within the cutter 33. Next, the roll of the recording sheet 23 is placed in position so as to be supported by the support shaft 25, and the recording sheet 23 is passed between the feed roller 30 and the pressure roller 31. In addition, the recording sheet 23 is wrapped around the platen roller 28 over the recording sheet 22, and the tip end of the recording sheet 23 is inserted within the cutter 33. Hence, after the recording sheet 22 is passed between the rollers 26 and 27 and the recording sheet 23 is passed between the rollers 30 and 31, the recording sheets 22 and 23 can be set in the same manner.

Figure 5:
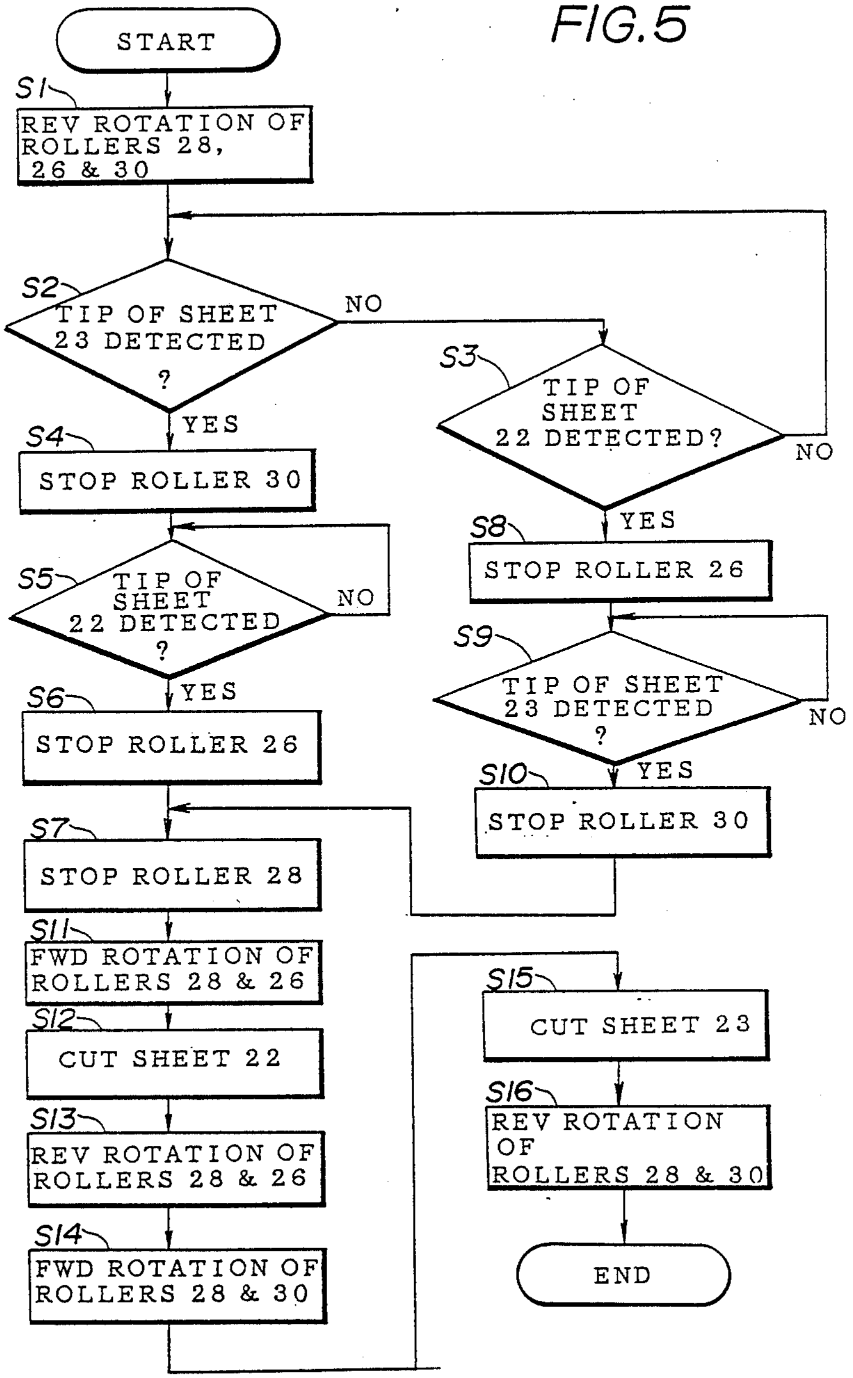
FIG. 5 is a flow chart for explaining a first embodiment of an initializing process carried out by a controller of the image recording apparatus shown in FIG. 4.

After the setting of the recording sheets 22 and 23 is completed, the controller 35 of the facsimile machine 21 carries out an initializing process for adjusting and appropriately positioning the tip ends of the set recording sheets 22 and 23. FIG. 5 shows a first embodiment of the initializing process carried out by the controller 35.

The initializing process of FIG. 5 is started when the setting of the recording sheets 22 and 23 is completed. The completion of the setting of the recording sheets 22 and 23 is detected as follows in this embodiment. That is, the controller detects the completion of the setting of the recording sheets 22 and 23 in the facsimile machine 21 when both the recording sheets 22 and 23 are detected by the respective paper sensors 29 and 32 and a closed state of a cover or door (not shown) of the image recording apparatus is detected by a sensor 36 shown in FIG. 4.

In FIG. 5, a step S1 controls and drives the drivers 28M, 26M, and 30M in the reverse direction so that the platen roller 28 rotates clockwise in FIG. 3 and the feed rollers 26 and 30 respectively rotate counterclockwise in FIG. 3. A step S2 discriminates from the output detection signal of the paper sensor 29 whether or not the tip end of the recording sheet 22 is detected. When the discrimination result in the step S2 is NO, a step S3 discriminates from the output detection signal of the paper sensor 32 whether or not the tip end of the recording sheet 23 is detected. The process returns to the step S2 when the discrimination result in the step S3 is NO.

When the discrimination result in the step S2 is YES, a step S4 stops the driver 30M so as to stop the counterclockwise rotation of the feed roller 30. A step S5 discriminates whether or not the tip end of the recording sheet 22 is detected by the paper sensor 29. When the discrimination result in the step S5 becomes YES, a step S6 stops the driver 26M so as to stop the counterclockwise rotation of the feed roller 26 and a step S7 stops the driver 28M so as to stop the clockwise rotation of the platen roller 28.

On the other hand, when the paper sensor 29 detects the tip end of the recording sheet 22 before the paper sensor 32 detects the tip end of the recording sheet 23, the discrimination result in the step S3 is YES. In this case, a step S8 stops the driver 26M so as to stop the counterclockwise rotation of the feed roller 26. Then, a step S9 discriminates whether or not the tip end of the recording sheet 23 is detected by the paper sensor 32. When the discrimination result in the step S9 becomes YES, a step S10 stops the driver 30M so as to stop the counterclockwise rotation of the feed roller 30. In addition, the step S7 stops the driver 28M so as to stop the clockwise rotation of the platen roller 28.

After the step S7, a step S11 rotates the drivers 28M and 26M in the forward direction so as to rotate the platen roller 28 counterclockwise and the feed roller 26 clockwise in FIG. 3 to transport the recording sheet 22 a predetermined distance in the forward direction until the tip end of the recording sheet 22 reaches a first predetermined position beyond the cutter 33, that is, on the downstream side of the cutter 33. This first predetermined position is on the left of the cutter 33 in FIG. 3. The predetermined distance may be controlled by counting the revolutions of the platen roller 28 or the feed roller 26 by a known rotation detection means 37, for example. Alternatively, the predetermined distance may be controlled by the number of rotation steps of a step motor which constitutes the driver 28M or 26M. A step S12 cuts the tip portion of the recording sheet 22 by the cutter 33. Thereafter, a step S13 rotates the drivers 28M and 26M in the reverse direction so as to rotate the platen roller 28 clockwise and the feed roller 26 counterclockwise in FIG. 3 to transport the recording sheet 22 a predetermined distance in the reverse direction until the tip end of the recording sheet 22 reaches a second predetermined position between the feed roller 26 and the platen roller 28. A step S14 rotates the drivers 30M and 28M in the forward direction so as to rotate the feed roller 30 clockwise and the platen roller 28 counterclockwise in FIG. 3 to transport the recording sheet 23 a predetermined distance in the forward direction until the tip end of the recording sheet 23 reaches a third predetermined position beyond the cutter 33, that is, on the downstream side of the cutter 33. This third predetermined position is on the left of the cutter 33 in FIG. 3 and may be identical to the first predetermined position described above. The predetermined distances may be controlled by counting the revolutions of the platen roller 28 or the feed roller 30 by the known rotation detection means 37, for example. Alternatively, the predetermined distances may be controlled by the number of rotation steps of a step motor which constitutes the driver 28M or 30M. A step S15 cuts the tip portion of the recording sheet 23 by the cutter 33. Thereafter, a step S16 rotates the drivers 28M and 30M in the reverse direction so as to rotate the platen roller 28 clockwise and the feed roller 30 counterclockwise in FIG. 3 to transport the recording sheet 23 a predetermined distance in the reverse direction until the tip end of the recording sheet 23 reaches a fourth predetermined position between the feed roller 30 and the platen roller 28. The initializing process is completed in this manner.

Accordingly, in this embodiment, the two kinds of recording sheets 22 and 23 can be set by similar operations, and the initializing process automatically cuts and adjusts the tip ends of the set recording sheets 22 and 23 and positions the tip ends of the recording sheets 22 and 23 to the respective initial positions which are the second and third predetermined positions. The operation of setting the recording sheets 22 and 23 is simple and easy, thereby making the facsimile machine 21 convenient and user-friendly to the operator. No manual cutter is required as in the conventional case, and the safety of the facsimile machine 21 is considerably improved in that there is no danger of the operator cutting his fingers and hands by the manual cutter.

In the initializing process shown in FIG. 5, the tip end processing which includes the cutting (adjusting) and positioning of the tip end of the recording sheet is first carried out with respect to the recording sheet 22. However, it is of course possible to first carry out the tip end processing with respect to the recording sheet 23.

Figure 6:
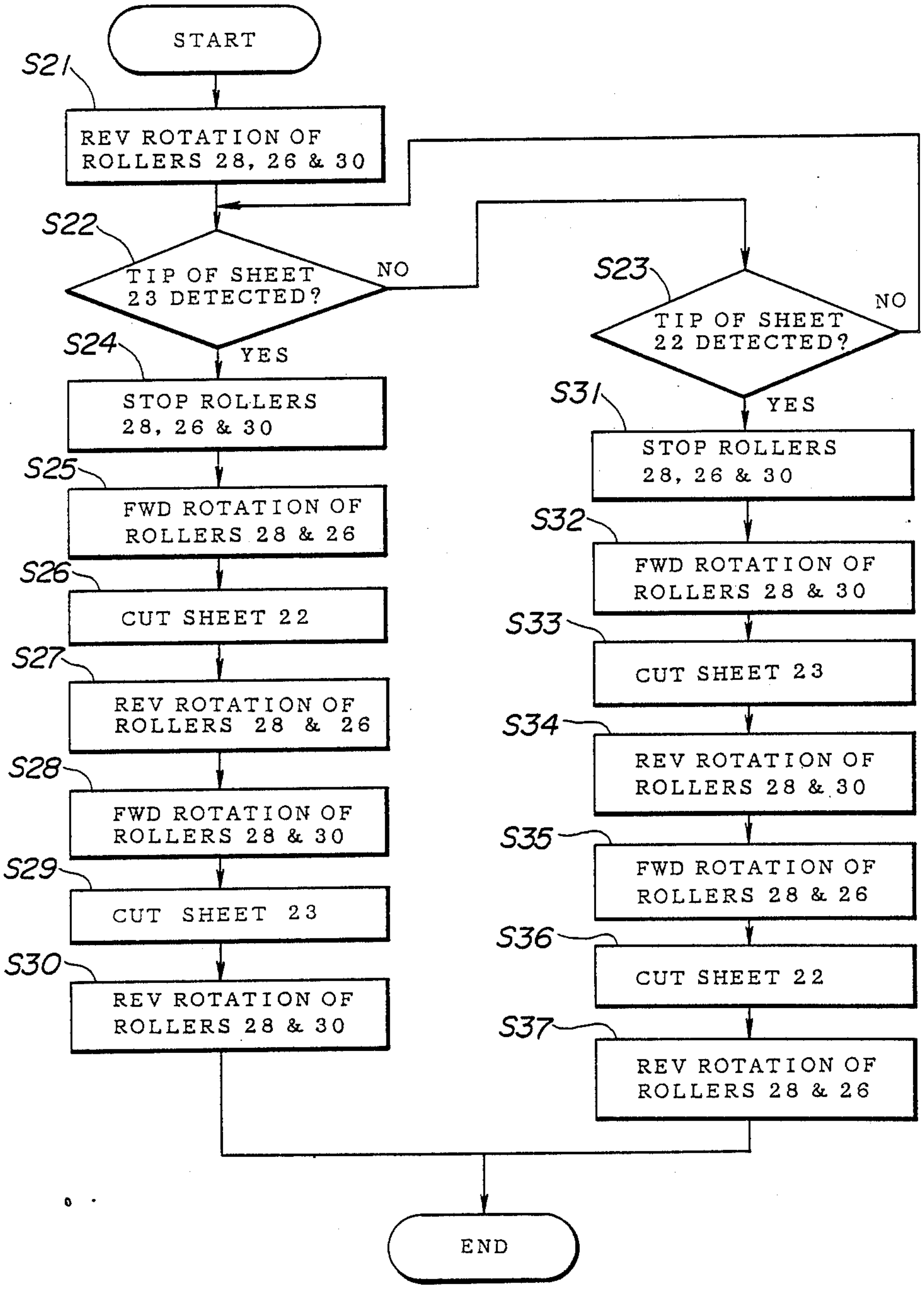
FIG. 6 is a flow chart for explaining a second embodiment of the initializing process carried out by the controller of the image recording apparatus shown in FIG. 4.

FIG. 6 shows a second embodiment of the initializing process carried out by the controller 35. In this embodiment, the recording sheets 22 and 23 after being set are transported in the reverse direction so as to be rewound on the respective rolls and this rewinding of both the recording sheets 22 and 23 is stopped when the tip end of either one of the recording sheets 22 and 23 is detected by the corresponding one of the paper sensors 29 and 32.

The initializing process of FIG. 6 is started when the setting of the recording sheets 22 and 23 is completed in a manner described before and the controller 35 detects the completion of the setting of the recording sheets 22 and 23 in the facsimile machine 21. A step S21 drives the drivers 28M, 26M, and 30M in the reverse direction so as to rotate the platen roller 28 clockwise and the feed rollers 26 and 30 counterclockwise in FIG. 3. A step S22 discriminates whether or not the tip end of the recording sheet 23 is detected by the paper sensor 32. When the discrimination result in the step S22 is NO, a step S23 whether or not the tip end of the recording sheet 22 is detected by the paper sensor 29. The process returns to the step S22 when the discrimination result in the step S23 is NO.

When the discrimination result in the step S22 is YES, a step S24 stops the drivers 28M, 26M, and 30M so as to stop the rollers 28, 26, and 30. Then, a step S25 drives the drivers 28M and 26M in the forward direction so as to rotate the platen roller 28 counterclockwise and the feed roller 26 clockwise until the tip end of the recording sheet 22 reaches the first predetermined position beyond the cutter 33. A step S26 cuts the tip portion of the recording sheet 22 by the cutter 33, and a step S27 drives the drivers 28M and 26M in the reverse direction so as to rotate the platen roller 28 clockwise and the feed roller 26 counterclockwise to transport the recording sheet 22 a predetermined distance in the reverse direction until the tip end of the recording sheet 22 reaches the second predetermined position between the platen roller 28 and the feed roller 26.

Next, a step S28 drives the drivers 28M and 30M in the forward direction so as to rotate the platen roller 28 counterclockwise and the feed roller 30 clockwise until the tip end of the recording sheet 23 reaches the third predetermined position beyond the cutter 33. A step S29 cuts the tip portion of the recording sheet 23 by the cutter 33, and a step S30 drives the drivers 28M and 30M in the reverse direction so as to rotate the platen roller 28 clockwise and the feed roller 30 counterclockwise to transport the recording sheet 23 a predetermined distance in the reverse direction until the tip end of the recording sheet 23 reaches the fourth predetermined position between the platen roller 28 and the feed roller 30.

On the other hand, when the discrimination result in the step S23 is YES, a step 31 stops the drivers 28M, 26M, and 30M so as to stop the rollers 28, 26, and 30. Then, a step S32 drives the drivers 28M and 30M in the forward direction so as to rotate the platen roller 28 counterclockwise and the feed roller 30 clockwise until the tip end of the recording sheet 23 reaches the third predetermined position beyond the cutter 33. A step S33 cuts the tip portion of the recording sheet 23 by the cutter 33, and a step S38 drives the drivers 28M and 30M in the reverse direction so as to rotate the platen roller 28 clockwise and the feed roller 30 counterclockwise to transport the recording sheet 23 a predetermined distance in the reverse direction until the tip end of the recording sheet 23 reaches the fourth predetermined position between the platen roller 28 and the feed roller 30.

Next, a step S35 drives the drivers 28M and 26M in the forward direction so as to rotate the platen roller 28 counterclockwise and the feed roller 26 clockwise until the tip end of the recording sheet 22 reaches the first predetermined position beyond the cutter 33. A step S36 cuts the tip portion o the recording sheet 22 by the cutter 33, and a step S37 drives the drivers 28M and 26M in the reverse direction so as to rotate the platen roller 28 clockwise and the feed roller 26 counterclockwise to transport the recording sheet 22 a predetermined distance in the reverse direction until the tip end of the recording sheet 22 reaches the second predetermined position between the platen roller 28 and the feed roller 26.

Accordingly, in this embodiment, the two kinds of recording sheets 22 and 23 can also be set by similar operations, and the initializing process automatically cuts and adjusts the tip ends of the set recording sheets 22 and 23 and positions the tip ends of the recording sheets 22 and 23 to the respective initial positions (second and third predetermined positions). The operation of setting the recording sheets 22 and 23 is simple and easy, thereby making the facsimile machine 21 convenient and user-friendly to the operator.

The manner in which the recording sheets 22 and 23 are set in the facsimile machine 21 is not limited to that described above, and it is not essential that the tip ends of the two recording sheets 22 and 23 are inserted within the cutter 33. The only requirement is that the tip ends of the recording sheets 22 and 23 are positioned on the downstream side of the respective paper sensors 29 and 32, that is, on the side of the respective paper sensors 29 and 32 closer to the platen roller 28.

Figure 7:
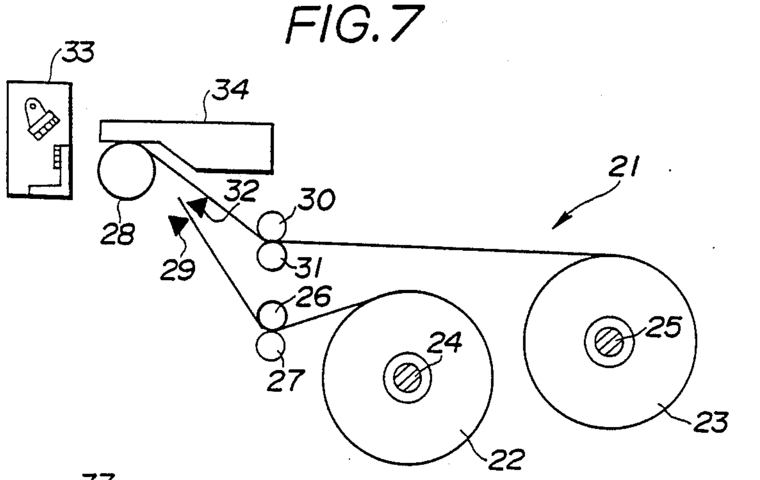
FIGS. 7 through 9 respectively show different embodiments of setting two kinds of recording sheets in the image recording apparatus.
Figure 8:
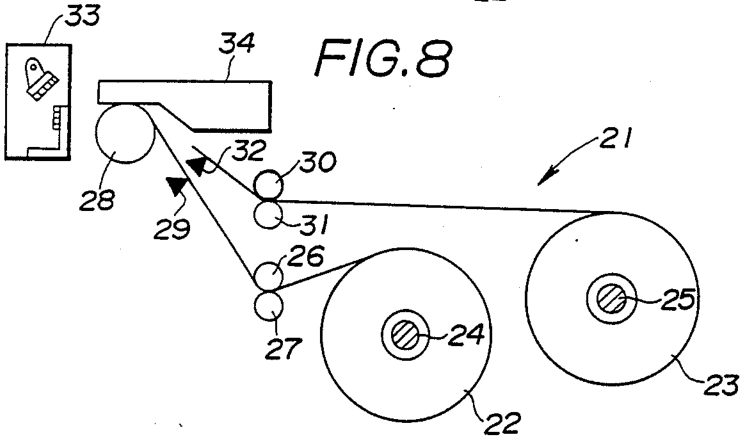
Figure 9:
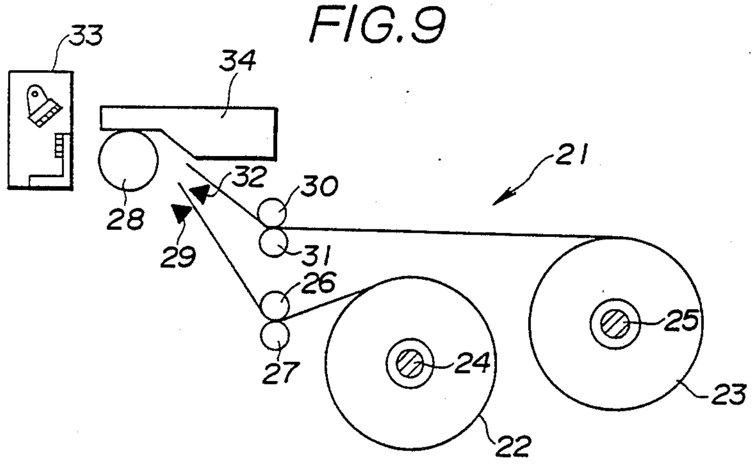

FIGS. 7 through 9 respectively show different embodiments of setting the two recording sheets 22 and 23 in the facsimile machine 21. In FIGS. 7 through 9, those parts which are the same as those corresponding parts in FIG. 3 are designated by the same reference numerals, and a description thereof will be omitted.

In FIG. 7, the recording sheet 22 is set so that the tip end thereof is positioned between the paper sensor 29 and the platen roller 28, while the recording sheet 23 is set so that the tip end thereof is positioned between the platen roller 28 and the cutter 33.

In FIG. 8, the recording sheet 22 is set so that the tip end thereof is positioned between the platen roller 28 and the cutter 33, while the recording sheet 23 is set so that the tip end thereof is positioned between the paper sensor 32 and the platen roller 28.

In FIG. 9, both the recording sheets 22 and 23 are set so that the tip ends thereof are positioned between the respective paper sensors 29 and 32 and the platen roller 28.

Therefore, when setting the recording sheets 22 and 23 in the facsimile machine 21, the tip ends of the recording sheets 22 and 23 need not be positioned with a high accuracy and the operation of setting the recording sheets 22 and 23 is simple and easy.

Figure 10:
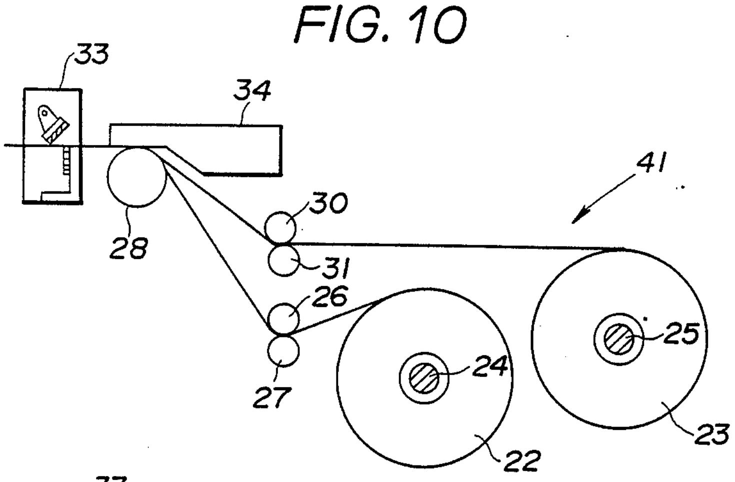
FIG. 10 generally shows an essential part of another embodiment of the image recording apparatus according to the present invention.

Next, a description will be given of another embodiment of the image recording apparatus according to the present invention, by referring to FIG. 10. This embodiment differs from the embodiment shown in FIG. 3 in that the paper sensors 29 and 32 are omitted. In FIG. 10, those parts which are the same as those corresponding parts in FIG. 3 are designated by the same reference numerals, and a description thereof will be omitted.

When changing the recording sheets of a facsimile machine 41, the new recording sheets 22 and 23 are set as follows. That is, the roll of the recording sheet 22 is first placed in position so as to be supported by the support shaft 24. Then, the recording sheet 22 is passed between the feed roller 26 and the pressure roller 27 and wrapped around the platen roller 28, and the tip end of the recording sheet 22 is inserted within the cutter 33 so that the tip end of the recording sheet 22 is positioned on the downstream side of the cutter 33. Next, the roll of the recording sheet 23 is placed in position so as to be supported by the support shaft 25, and the recording sheet 23 is passed between the feed roller 30 and the pressure roller 31. In addition, the recording sheet 23 is wrapped around the platen roller 28 over the recording sheet 22, and the tip end of the recording sheet 23 is inserted within the cutter 33 so that the tip end of the recording sheet 23 is positioned on the downstream side of the cutter 33. Hence, after the recording sheet 22 is passed between the rollers 26 and 27 and the recording sheet 23 is passed between the rollers 30 and 31, the recording sheets 22 and 23 can be set in the same manner. The setting operation is simple and safe in that no manual cutter is used.

Figure 11:
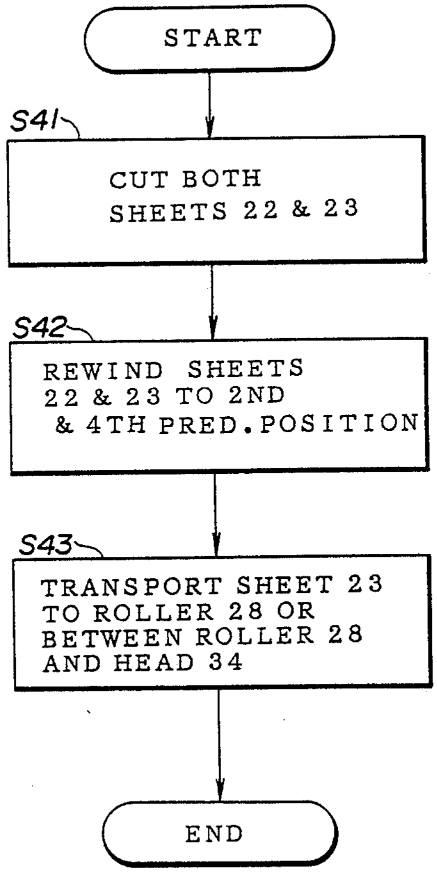
FIG. 11 is a flow chart for explaining an embodiment of an initializing process carried out by a controller of the image recording apparatus shown in FIG. 10.

After the setting of the recording sheets 22 and 23 is completed, the controller 35 of the facsimile machine 41 carries out an initializing process for adjusting and appropriately positioning the tip ends of the set recording sheets 22 and 23. FIG. 11 shows a first embodiment of the initializing process carried out by the controller 35.

The initializing process of FIG. 11 is started when the setting of the recording sheets 22 and 23 is completed. The completion of the setting of the recording sheets 22 and 23 is detected as described before. That is, the controller 35 detects the completion of the setting of the recording sheets 22 and 23 in the facsimile machine 21 when both the recording sheets 22 and 23 are detected by the respective paper sensors 29 and 32 and the closed state of the cover or door (not shown) of the image recording apparatus is detected by the sensor 36.

Figure 12:
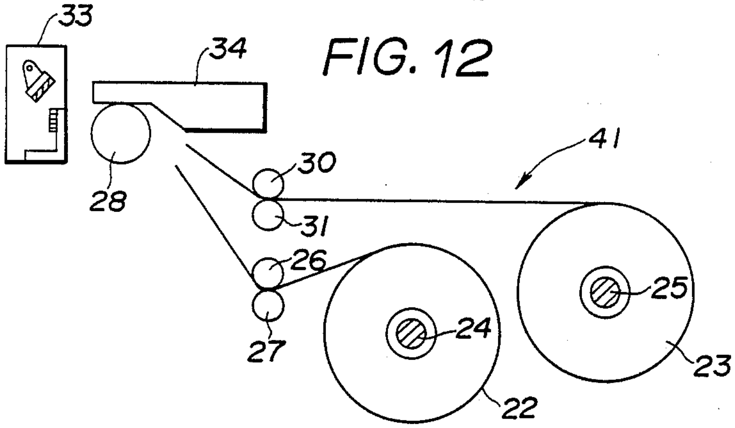
FIGS. 12 and 13 respectively show the essential part of the image recording apparatus shown in FIG. 10 in different stages of the initializing process.

In FIG. 11, a step S41 drives the cutter 33 and simultaneously cuts the tip portions of the two recording sheets 22 and 23 by the cutter 33. A step S42 drives the drivers 28M and 26M in the reverse direction so as to rotate the platen roller 28 clockwise and the feed roller 26 counterclockwise in FIG. 10 to transport the recording sheet 22 a predetermined distance in the reverse direction until the tip end of the recording sheet 22 reaches the second predetermined position between the platen roller 28 and the feed roller 26. At the same time, the step S42 also drives the driver 30M in the reverse direction so as to rotate the feed roller 30 counterclockwise in FIG. 10 to transport the recording sheet 23 a predetermined distance in the reverse direction until the tip end of the recording sheet 23 reaches the fourth predetermined position between the platen roller 28 and the feed roller 30. The tip ends of the recording sheets 22 and 23 are at the respective second and fourth predetermined positions in a state shown in FIG. 12. The predetermined distances may be controlled by counting the revolutions of the platen roller 28 or the feed rollers 26 and 30 by the known rotation detection means 37, or by controlling the number of rotation steps of the step motor which constitutes the driver 28M, 26M or 30M, for example.

Figure 13:
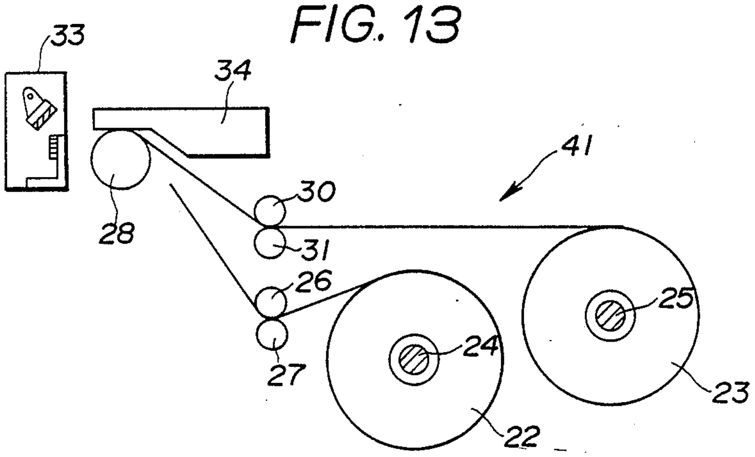

Then, a step S43 drives the drivers 28M and 30M in the forward direction so as to rotate the platen roller 28 counterclockwise and the feed roller 30 clockwise in FIG. 10 to transport the recording sheet 23 a predetermined distance in the forward direction until the tip end of the recording sheet 23 reaches a position on the platen roller 28 or between the platen roller 28 and the thermal head 34. In this state, the tip ends of the recording sheets 22 and 23 are located at the positions shown in FIG. 13. This predetermined distance may be controlled similarly as described above by counting the revolutions of the platen roller 28 or the feed roller 30 by the known rotation detection means 37, or by controlling the number of rotation steps of the step motor which constitutes the driver 28M or 30M, for example.

According to this embodiment, the two kinds of recording sheets 22 and 23 can be set by similar operations, and the initializing process automatically cuts the tip ends of the set recording sheets 22 and 23 simultaneously and positions the tip ends of the recording sheets 22 and 23 to the respective initial positions. The operation of setting the recording sheets 22 and 23 is simple and easy, thereby making the facsimile machine 21 convenient and user-friendly to the operator. No manual cutter is required as in the conventional case, and the safety of the facsimile machine 41 is considerably improved in that there is no danger of the operator cutting his fingers and hands by the manual cutter.

In the described embodiments, the image recording apparatus is described as a facsimile machine for the sake of convenience. However, the present invention is of course applicable to other image recording apparatuses, and the recording system is not limited to the thermal recording system. For example, an ink jet system may be employed as the recording system.

In addition, the present invention is similarly applicable to an image recording apparatus which uses more than two rolls of recording sheets.

The drivers 26M, 28M, and 30M for driving the corresponding rollers 26, 28, and 30 need not necessarily be independent motors. It is of course possible to drive more than one roller by use of a common motor via appropriate driving mechanisms.

Further, the present invention is not limited to these embodiments, but various variations and modifications may be made without departing from the scope of the present invention.

What is claimed is:

1. An image recording apparatus comprising:

first support means for supporting a first roll of a first recording sheet;

second support means for supporting a second roll of a second recording sheet;

first transport means including a first roller for transporting the first recording sheet in forward and reverse directions;

second transport means including a second roller for transporting the second recording sheet in the forward and reverse directions;

a platen roller located at a position on a downstream side of said first and second transport means along the forward direction;

driver means for rotating said platen roller in directions for transporting the first and second recording sheets in the forward and reverse directions;

recording means for recording an image on one of the first and second recording sheets placed on said platen roller;

a first sensor for detecting the first recording sheet in a transport path between said first transport means and said platen roller;

a second sensor for detecting the second recording sheet in a transport path between said second transport means and said platen roller;

a cutter located at a position on the downstream side of said platen roller along the forward direction; and control means for controlling said first and second transport means, said driver means, and said cutter responsive to output detection signals of said first and second sensors, in an initial state the first and second rolls of the first and second recording sheets being set in said image recording apparatus so that tip ends of the first and second recording sheets are located on the downstream side of the corresponding first and second sensors along the forward direction, said control means controlling an initializing process for adjusting and appropriately positioning the tip ends of the set first and second recording sheets by driving said first and second transport means to transport the first and second recording sheets in the reverse direction until the tip ends thereof are detected by said first and second sensors, after the tip end of the first recording sheet is detected driving said first transport means to transport the first recording sheet a distance in the forward direction until the tip end thereof reaches a position on the downstream side of said cutter, driving said cutter to cut a tip portion of the first recording sheet, driving said first transport means to transport the first recording sheet a distance in the reverse direction until a cut end of the first recording sheet reaches a first predetermined position between said platen roller and the first roller of said first transport means, after the tip end of the second recording sheet is detected driving said second transport means to transport the second recording sheet a distance in the forward direction until the tip end thereof reaches a position on the downstream side of said cutter, driving said cutter to cut a tip portion of the second recording sheet, driving said second transport means to transport the second recording sheet a distance in the reverse direction until a cut end of the second recording sheet reaches a second predetermined position between said platen roller and the second roller of said second transport means.

2. The image recording apparatus as claimed in claim 1 wherein said first transport means includes a first step motor for rotating the first roller and said second transport means includes a second step motor for rotating the second roller, said control means controlling the distances over which the first and second recording sheets are transported in the forward and reverse directions by controlling numbers of rotation steps of the first and second step motors.

3. The image recording apparatus as claimed in claim 1 which further comprises rotation detecting means for detecting a rotation of said platen roller, said control means controlling the distances over which the first and second recording sheets are transported in the forward and reverse directions by controlling said driving means responsive to the rotation detected by said rotation detecting means.

4. The image recording apparatus as claimed in claim 1 which further comprises rotation detecting means for detecting rotations of the first and second rollers of said first and second transport means, said control means controlling the distances over which the first and second recording sheets are transported in the forward and reverse directions by controlling said first and second transport means responsive to the rotations detected by said rotation detecting means.

5. The image recording apparatus as claimed in claim 1 which further comprises a third sensor for detecting an operable state of said image recording apparatus, said control means detecting the initial state when said first and second sensors respectively detect the first and second recording sheets and said third sensor detects the operable state.

6. The image recording apparatus as claimed in claim 1 wherein said recording means includes a thermal head and said first and second recording sheets are thermally sensitive paper.

7. The image recording apparatus as claimed in claim 1 wherein said recording means includes a thermal head and said first and second recording sheets are plain paper.

8. An image recording apparatus comprising:

first support means for supporting a first roll of a first recording sheet;

second support means for supporting a second roll of a second recording sheet;

first transport means including a first roller for transporting the first recording sheet in forward and reverse directions;

second transport means including a second roller for transporting the second recording sheet in the forward and reverse directions;

a platen roller located at a position on a downstream side of said first and second transport means along the forward direction;

driver means for rotating said platen roller in directions for transporting the first and second recording sheets in the forward and reverse directions;

recording means for recording an image on one of the first and second recording sheets placed on said platen roller;

a first sensor for detecting the first recording sheet in a transport path between said first transport means and said platen roller;

a second sensor for detecting the second recording sheet in a transport path between said second transport means and said platen roller;

a cutter located at a position on the downstream side of said platen roller along the forward direction; and control means for controlling said first and second transport means, said driver means, and said cutter responsive to output detection signals of said first and second sensors, in an initial state the first and second rolls of the first and second recording sheets being set in said image recording apparatus so that tip ends of the first and second recording sheets are located on the downstream side of the corresponding first and second sensors along the forward direction, said control means controlling an initializing process for adjusting and appropriately positioning the tip ends of the set first and second recording sheets by driving said first and second transport means to transport the first and second recording sheets in the reverse direction until the tip end one of the first and second recording sheets is detected by a corresponding one of said first and second sensors, after the tip end of said one of the first and second recording sheets is detected driving a corresponding one of said first and second transport means to transport said one of the first and second recording sheets a distance in the forward direction until the tip end thereof reaches a position on the downstream side of said cutter, driving said cutter to cut a tip portion of said one of the first and second recording sheets, driving said one of said first and second transport means to transport said one of the first and second recording sheets a distance in the reverse direction until a cut end of said one of the first and second recording sheets reaches a first predetermined position between said platen roller and a corresponding one of the first and second rollers of said first and second transport means, driving the other of said first and second transport means to transport the other of the first and second recording sheets a distance in the forward direction until the tip end thereof reaches a position on the downstream side of said cutter, driving said cutter to cut a tip portion of the other of the first and second recording sheets, driving said other of said first and said second transport means to transport the other of the first and second recording sheets a distance in the reverse direction until a cut end of the other of the first and second recording sheets reaches a second predetermined position on the downstream side of said other of said first and second transport means along the forward direction.

9. The image recording apparatus as claimed in claim 8 wherein said first transport means includes a first step motor for rotating the first roller and said second transport means includes a second step motor for rotating the second roller, said control means controlling the distances over which the first and second recording sheets are transported in the forward and reverse directions by controlling numbers of rotation steps of the first and second step motors.

10. The image recording apparatus as claimed in claim 8 which further comprises rotation detecting means for detecting a rotation of said platen roller, said control means controlling the distances over which the first and second recording sheets are transported in the forward and reverse directions by controlling said driving means responsive to the rotation detected by said rotation detecting means.

11. The image recording apparatus as claimed in claim 8 which further comprises rotation detecting means for detecting rotations of the first and second rollers of said first and second transport means, said control means controlling the distances over which the first and second recording sheets are transported in the forward and reverse directions by controlling said first and second transport means responsive to the rotations detected by said rotation detecting means.

12. The image recording apparatus as claimed in claim 8 which further comprises a third sensor for detecting an operable state of said image recording apparatus, said control means detecting the initial state when said first and second sensors respectively detect the first and second recording sheets and said third sensor detects the operable state.

13. The image recording apparatus as claimed in claim 8 wherein said recording means includes a thermal head and said first and second recording sheets are thermally sensitive paper.

14. The image recording apparatus as claimed in claim 8 wherein said recording means includes a thermal head and said first and second recording sheets are plain paper.

15. An image recording apparatus comprising:

first support means for supporting a first roll of a first recording sheet;

second support means for supporting a second roll of a second recording sheet;

first transport means including a first roller for transporting the first recording sheet in forward and reverse directions;

second transport means including a second roller for transporting the second recording sheet in the forward and reverse directions;

a platen roller located at a position on a downstream side of said first and second transport means along the forward direction;

driver means for rotating said platen roller in directions for transporting the first and second recording sheets in the forward and reverse directions;

recording means for recording an image on one of the first and second recording sheets placed on said platen roller;

a cutter located at a position on the downstream side of said platen roller along the forward direction; and control means for controlling said first and second transport means, said driver means, and said cutter, in an initial state the first and second rolls of the first and second recording sheets being set in said image recording apparatus so that tip ends of the first and second recording sheets are located on the downstream side of said cutter along the forward direction, said control means controlling an initializing process for adjusting and appropriately positioning the tip ends of the set first and second recording sheets by driving said cutter to cut a tip portion of each of the first and second recording sheets, driving said first and second transport means to transport the first and second recording sheets respective distances in the reverse direction until a cut end of the first recording sheet reaches a first predetermined position between said platen roller and the first roller of said first transport means and a cut end of the second recording sheet reaches a second predetermined position between said platen roller and the second roller of said second transport means.

16. The image recording apparatus as claimed in claim 15 wherein said first transport means includes a first step motor for rotating the first roller and said second transport means includes a second step motor for rotating the second roller, said control means controlling the distances over which the first and second recording sheets are transported in the reverse direction by controlling numbers of rotation steps of the first and second step motors.

17. The image recording apparatus as claimed in claim 15 which further comprises rotation detecting means for detecting a rotation of said platen roller, said control means controlling the distances over which the first and second recording sheets are transported in the reverse direction by controlling said driving means responsive to the rotation detected by said rotation detecting means.

18. The image recording apparatus as claimed in claim 15 which further comprises rotation detecting means for detecting rotations of the first and second rollers of said first and second transport means, said control means controlling the distances over which the first and second recording sheets are transported in the reverse directions by controlling said first and second transport means responsive to the rotations detected by said rotation detecting means.

19. The image recording apparatus as claimed in claim 15 which further comprises a third sensor for detecting an operable state of said image recording apparatus, said control means detecting the initial state when said third sensor detects the operable state.

20. The image recording apparatus as claimed in claim 15 wherein said recording means includes a thermal head and said first and second recording sheets are thermally sensitive paper.

21. The image recording apparatus as claimed in claim 15 wherein said recording means includes a thermal head and said first and second recording sheets are plain paper.

22. A method of automatically carrying out an initializing process with respect to recording sheets of the image recording apparatus for adjusting and appropriately positioning tip ends of first and second recording sheets which are set in said image recording apparatus, said image recording apparatus comprising first support means for supporting a first roll of the first recording sheet, second support means for supporting a second roll of the second recording sheet, first transport means including a first roller for transporting the first recording sheet in forward and reverse directions, second transport means including a second roller for transporting the second recording sheet in the forward and reverse directions, a platen roller located at a position on a downstream side of said first and second transport means along the forward direction, driver means for rotating said platen roller in directions for transporting the first and second recording sheets in the forward and reverse directions, recording means for recording an image on one of the first and second recording sheets placed on said platen roller, a cutter located at a position on the downstream side of said platen roller along the forward direction, and control means for controlling said first and second transport means, said driver means, and said cutter, in an initial state the first and second rolls of the first and second recording sheets being set in said image recording apparatus so that tip ends of the first and second recording sheets are located on the downstream side of the corresponding first and second rollers of said first and second transport means along the forward direction, said method comprising the steps of:

driving said first and second transport means to transport the first and second recording sheets in the reverse direction until the tip ends thereof are detected;

after the tip end of the first recording sheet is detected driving said first transport means to transport the first recording sheet a distance in the forward direction until the tip end thereof reaches a position on the downstream side of said cutter;

driving said cutter to cut a tip portion of the first recording sheet;

driving said first transport means to transport the first recording sheet a distance in the reverse direction until a cut end of the first recording sheet reaches a first predetermined position between said platen roller and the first roller of said first transport means;

after the tip end of the second recording sheet is detected driving said second transport means to transport the second recording sheet a distance in the forward direction until the tip end thereof reaches a position on the downstream side of said cutter;

driving said cutter to cut a tip portion of the second recording sheet; and driving said second transport means to transport the second recording sheet a distance in the reverse direction until a cut end of the second recording sheet reaches a second predetermined position between said platen roller and the second roller of said second transport means.

23. A method of automatically carrying out an initializing process with respect to recording sheets of the image recording apparatus for adjusting and appropriately positioning tip ends of first and second recording sheets which are set in said image recording apparatus, said image recording apparatus comprising first support means for supporting a first roll of the first recording sheet, second support means for supporting a second roll of the second recording sheet, first transport means including a first roller for transporting the first recording sheet in forward and reverse directions, second transport means including a second roller for transporting the second recording sheet in the forward and reverse directions, a platen roller located at a position on a downstream side of said first and second transport means along the forward direction, driver means for rotating said platen roller in directions for transporting the first and second recording sheets in the forward and reverse directions, recording means for recording an image on one of the first and second recording sheets placed on said platen roller, a cutter located at a position on the downstream side of said platen roller along the forward direction, and control means for controlling said first and second transport means, said driver means, and said cutter, in an initial state the first and second rolls of the first and second recording sheets being set in said image recording apparatus so that tip ends of the first and second recording sheets are located on the downstream side of the corresponding first and second rollers of said first and second transport means along the forward direction, said method comprising the steps of:

driving said first and second transport means to transport the first and second recording sheets in the reverse direction until the tip end one of the first and second recording sheets is detected;

after the tip end of said one of the first and second recording sheets is detected driving a corresponding one of said first and second transport means to transport said one of the first and second recording sheets a distance in the forward direction until the tip end thereof reaches a position on the downstream side of said cutter;

driving said cutter to cut a tip portion of said one of the first and second recording sheets;

driving said one of said first and second transport means to transport said one of the first and second recording sheets a distance in the reverse direction until a cut end of said one of the first and second recording sheets reaches a first predetermined position between said platen roller and a corresponding one of the first and second rollers of said first and second transport means;

driving the other of said first and second transport means to transport the other of the first and second recording sheets a distance in the forward direction until the tip end thereof reaches a position on the downstream side of said cutter;

driving said cutter to cut a tip portion of the other of the first and second recording sheets; and driving said other of said first and said second transport means to transport the other of the first and second recording sheets a distance in the reverse direction until a cut end of the other of the first and second recording sheets reaches a second predetermined position on the downstream side of said other of said first and second transport means along the forward direction.

24. A method of automatically carrying out an initializing process with respect to recording sheets of the image recording apparatus for adjusting and appropriately positioning tip ends of first and second recording sheets which are set in said image recording apparatus, said image recording apparatus comprising first support means for supporting a first roll of a first recording sheet, second support means for supporting a second roll of a second recording sheet, first transport means including a first roller for transporting the first recording sheet in forward and reverse directions, second transport means including a second roller for transporting the second recording sheet in the forward and reverse directions, a platen roller located at a position on a downstream side of said first and second transport means along the forward direction, driver means for rotating said platen roller in directions for transporting the first and second recording sheets in the forward and reverse directions, recording means for recording an image on one of the first and second recording sheets placed on said platen roller, a cutter located at a position on the downstream side of said platen roller along the forward direction, and control means for controlling said first and second transport means, said driver means, and said cutter, in an initial state the first and second rolls of the first and second recording sheets being set in said image recording apparatus so that tip ends of the first and second recording sheets are located on the downstream side of said cutter along the forward direction, said method comprising the steps of:

driving said cutter to cut a tip portion of each of the first and second recording sheets; and driving said first and second transport means to transport the first and second recording sheets respective distances in the reverse direction until a cut end of the first recording sheet reaches a first predetermined position between said platen roller and the first roller of said first transport means and a cut end of the second recording sheet reaches a scion predetermined position between said platen roller and the second roller of said second transport means.

* * * * *